United States Patent
Ito et al.

(10) Patent No.: US 11,359,111 B2
(45) Date of Patent: Jun. 14, 2022

(54) THERMALLY CONDUCTIVE THIN-FILM CURED PRODUCT, METHOD FOR PRODUCING SAME, AND THERMALLY CONDUCTIVE MEMBER

(71) Applicant: SHIN-ETSU CHEMICAL CO., LTD., Tokyo (JP)

(72) Inventors: Takanori Ito, Annaka (JP); Akihiro Endo, Annaka (JP); Yuki Tanaka, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 35 days.

(21) Appl. No.: 16/962,733

(22) PCT Filed: Jan. 8, 2019

(86) PCT No.: PCT/JP2019/000139
§ 371 (c)(1),
(2) Date: Jul. 16, 2020

(87) PCT Pub. No.: WO2019/142688
PCT Pub. Date: Jul. 25, 2019

(65) Prior Publication Data
US 2020/0354526 A1   Nov. 12, 2020

(30) Foreign Application Priority Data

Jan. 17, 2018  (JP) .............................. JP2018-005469

(51) Int. Cl.
| | | |
|---|---|---|
| C09D 183/04 | (2006.01) | |
| C08K 3/22 | (2006.01) | |
| C08G 77/50 | (2006.01) | |
| C08J 5/18 | (2006.01) | |
| C08K 3/08 | (2006.01) | |
| C08K 3/20 | (2006.01) | |
| C08K 3/28 | (2006.01) | |
| C08K 5/5425 | (2006.01) | |
| C09J 11/04 | (2006.01) | |
| C09J 11/06 | (2006.01) | |
| C09J 11/08 | (2006.01) | |
| C09K 5/14 | (2006.01) | |

(52) U.S. Cl.
CPC .......... *C09D 183/04* (2013.01); *C08G 77/50* (2013.01); *C08J 5/18* (2013.01); *C08K 3/08* (2013.01); *C08K 3/20* (2013.01); *C08K 3/28* (2013.01); *C08K 5/5425* (2013.01); *C09J 11/04* (2013.01); *C09J 11/06* (2013.01); *C09J 11/08* (2013.01); *C09K 5/14* (2013.01); *C08K 2003/2227* (2013.01); *C09J 2203/326* (2013.01)

(58) Field of Classification Search
CPC ...... C08K 2003/085; C08K 2003/0812; C08K 2003/222; C08K 2003/2241; C08K 2003/2265; C08K 2003/2244; C08K 2003/282; C08K 2003/382; C08K 2003/2227; C08L 83/04
See application file for complete search history.

(56) References Cited

U.S. PATENT DOCUMENTS

| | | | |
|---|---|---|---|
| 5,283,307 A | 2/1994 | Larson | |
| 5,405,896 A * | 4/1995 | Fujiki | C07F 7/0896 524/265 |
| 2002/0019274 A1* | 2/2002 | Sajima | A63B 37/0018 473/378 |
| 2002/0028335 A1* | 3/2002 | Fujiki | C08L 83/04 428/447 |
| 2008/0254247 A1 | 10/2008 | Asaine | |

(Continued)

FOREIGN PATENT DOCUMENTS

| | | |
|---|---|---|
| JP | 6-172653 A | 6/1994 |
| JP | 2002-121529 A | 4/2002 |

(Continued)

OTHER PUBLICATIONS

International Search Report (PCT/ISA/210) issued in PCT/JP2019/000139, dated Apr. 9, 2019.

(Continued)

*Primary Examiner* — Marc S Zimmer
(74) *Attorney, Agent, or Firm* — Birch, Stewart, Kolasch & Birch, LLP

(57) ABSTRACT

Provided is a thermally conductive thin-film cured product constituted by a cured product of a handleable silicone composition, the cured product having good transferability to a member and good post-debonding handling properties, and exhibiting good bond strength to a heat-generating element, even at elevated temperatures. The thermally conductive thin-film cured product is obtained by curing a silicone composition containing: (a) 100 parts by mass of an organopolysiloxane comprising two or more alkenyl groups per molecule; 200-2,000 parts by mass, inclusive, of a thermally conductive filler; (c) an amount of an organohydrodiene polysiloxane comprising two or more hydrogen atoms directly bonded to a silicon atom per molecule such that Si—H/alkenyl groups is 0.5-50.0, inclusive; (d) an amount of a platinum group metal compound equal to 0.1-1,000 ppm (mass), inclusive, with respect to component (a) in terms of the mass of the platinum group metal element; (e) a reaction regulator, as required; (f) 50-300 parts by mass, inclusive, of a silicone resin; and (g) 0.1-20 parts by mass, inclusive, of an adhesive component selected from (g-1) or (g-2).

11 Claims, No Drawings

(56) References Cited

U.S. PATENT DOCUMENTS

2014/0051806 A1    2/2014  Kato
2015/0299531 A1    10/2015  Tojo et al.
2016/0355714 A1*  12/2016  Newsham ............... C08L 83/04
2018/0037013 A1*  2/2018  Endo .................... C09D 183/04

FOREIGN PATENT DOCUMENTS

| JP | 2009-235279 A | 10/2009 |
| --- | --- | --- |
| JP | 5283346 B2 | 9/2013 |
| JP | 2014-34652 A | 2/2014 |
| JP | 2014-37507 A | 2/2014 |
| JP | 2014-62220 A | 4/2014 |
| JP | 2015-131978 A | 7/2015 |

OTHER PUBLICATIONS

Written Opinion of the International Searching Authority (PCT/ISA/237) issued in PCT/JP2019/000139, dated Apr. 9, 2019.

\* cited by examiner

THERMALLY CONDUCTIVE THIN-FILM CURED PRODUCT, METHOD FOR PRODUCING SAME, AND THERMALLY CONDUCTIVE MEMBER

TECHNICAL FIELD

The present invention relates to a heat-conductive cured product, particularly a heat-conductive thin film-like cured product that can be set between a thermal interface on a heat-generating element and a heat-dissipating member such as a heat sink or a circuit substrate. The invention also relates to a method for producing such a cured product and to a heat-conductive member.

BACKGROUND ART

With current trends toward higher functionality, higher speeds, smaller sizes and higher integration, the semiconductor devices such as transistors and diodes that are used in converters, power supplies and other electronic equipment and the LEDs that serve as light sources for lighting and displays have come to generate large amounts of heat themselves. The rise in temperature of such equipment due to this heat triggers malfunctions and breakdowns. Numerous heat-dissipating methods for the suppression of temperature rise by semiconductor devices during operation, as well as heat-dissipating members for use therein, have been described in order to address this problem.

To hold down temperature rises by semiconductor devices during operation in electronic equipment, the heat generated by a semiconductor device has hitherto been conducted by a heat-conductive material to a heat sink that uses plates made of a high thermal conductivity metal such as aluminum or copper or to a housing or other cooling member, and then released to the exterior via the temperature difference with ambient air. Numerous heat-conductive sheets with electrically insulating properties are used as heat-conductive materials. In addition, screws, clips or the like are used to secure the cooling member and the semiconductor device. The heat-conductive sheet situated therebetween also is secured in place by pressing with screws or clips. However, a fastening method that uses screws or clips, because it must pass through the steps of preparing the screws or clips for use, forming holes in the housing, semiconductor device, substrate, etc. for attaching the screws, and then fastening, increases both the parts count and the number of steps, which is highly disadvantageous from the standpoint of production efficiency. Moreover, parts such as screws and clips impede efforts to achieve smaller sizes and thinner dimensions in the electronic equipment itself and are highly disadvantageous in terms of product design as well. One conceivable approach is to impart tack to the heat-conductive sheet placed between a cooling member and a semiconductor device and in this way secure the housing and the semiconductor device.

Specifically, there is the method of applying a pressure-sensitive adhesive to both sides of a heat-conductive sheet so as to form a pressure-sensitive adhesive-coated sheet. But the adhesive itself lacks heat conductivity, and so heat transfer by the adhesive-coated thermally conductive sheet is extremely poor. This is addressed by heat-conductive pressure-sensitive adhesive tapes in which the adhesive contains a thermally conductive filler (Patent Document 1: JP-A 2014-34652; Patent Document 2: JP-A 2014-62220; Patent Document 3: JP-A 2002-121529). In particular, heat-conductive silicone pressure-sensitive adhesive tapes in which silicone is used as the polymer are known for their heat resistance, cold resistance and durability (Patent Document 4: JP No. 5283346). However, a drawback of pressure-sensitive adhesive tapes is their poor bond strength compared with ordinary adhesive materials, especially at elevated temperatures. Also, the operations during the coating process become involved with heat-curable adhesives, making the work more difficult to carry out than for pressure-sensitive adhesive sheets.

PRIOR ART DOCUMENTS

Patent Documents

Patent Document 1: JP-A 2014-34652
Patent Document 2: JP-A 2014-62220
Patent Document 3: JP-A 2002-121529
Patent Document 4: JP No. 5283346

SUMMARY OF INVENTION

Technical Problem

In light of the above circumstances, an object of the present invention is to provide a heat-conductive thin film-like cured product which is a cured silicone composition that can be easily handled even as a single layer or thin film, which has a good transferability to a member and a good handleability following release, and which exhibits a good bond strength to heat-generating elements even at elevated temperatures. Additional objects of the invention are to provide a method for producing such a cured product, and a heat-conductive member which uses such a cured product.

Solution to Problem

The inventors have conducted extensive investigations in order to achieve this object. As a result, they have discovered that, as demonstrated in the subsequently described examples, a heat-conductive thin film-like cured product obtained from a silicone composition prepared by including a heat-conductive filler in an addition reaction-curable silicone rubber composition and including also suitable amounts of silicone resin and a specific adhesive component has a good transferability to a member and a good handleability following release, exhibits a good bond strength to heat-generating elements even at elevated temperatures and, when set between a heat-generating device and a heat-dissipating member, is very effective as a heat-conductive member for transferring generated heat from the heat-generating device to the heat-dissipating member. This discovery ultimately led to the present invention.

Accordingly, the present invention provides the following heat-conductive thin film-like cured product and method of production thereof, and the following heat-conductive member.

1. A heat-conductive thin film-like cured product obtained by curing a silicone composition which includes:
    (a) 100 parts by weight of an organopolysiloxane having at least two alkenyl groups per molecule,
    (b) 200 to 2,000 parts by weight of a heat-conductive filler,
    (c) an organohydrogenpolysiloxane having at least two directly silicon-bonded hydrogen atoms per molecule, in an amount such that the ratio (number of directly silicon-bonded hydrogen atoms in component (c))/(number of alkenyl groups in component (a)) is from 0.5 to 50.0, (d) a platinum group metal compound in an amount relative to component (a), expressed in terms of the amount of platinum group metal element, of from 0.1 to 1,000 ppm (weight), (e) a necessary amount of a reaction regulator, (f) 50 to 300 parts by weight of a silicone resin, and (g) 0.1 to 20 parts by weight of an adhesive ingredient selected from (g-1) and (g-2) below (g-1) a compound of general formula (1) below

[Chem. 1]

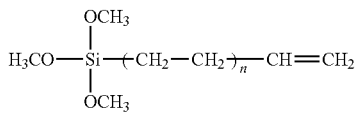

(1)

(wherein n is an integer from 1 to 15)

(g-2) an organosilicon compound of from 1 to 100 silicon atoms which has at least one phenylene skeleton and at least one silicon-bonded hydrogen atom per molecule.

2. The heat-conductive thin film-like cured product of 1, wherein component (f) is a silicone resin containing $R^1_3SiO_{1/2}$ units (wherein $R^1$ is a substituted or unsubstituted monovalent hydrocarbon group that has no aliphatic unsaturated bonds) and $SiO_{4/2}$ units in a molar ratio expressed as ($R^1_3SiO_{1/2}$ units)/($SiO_{4/2}$ units) of from 0.1 to 3.0.

3. The heat-conductive thin film-like cured product of 1 or 2, wherein the silicone composition further includes 0.1 to 40 parts by weight of one or more surfactant selected from (h-1) and (h-2) below:

(h-1) an alkoxysilane compound of general formula (2) below $$R^2_a R^3_b Si(OR^4)_{4-a-b}$$ (2)

(wherein each $R^2$ is independently an alkyl group of 6 to 15 carbon atoms, each $R^3$ is independently a substituted or unsubstituted monovalent hydrocarbon group of 1 to 8 carbon atoms, each $R^4$ is independently an alkyl group of 1 to 6 carbon atoms, the subscript "a" is an integer from 1 to 3, the subscript "b" is an integer from 0 to 2, and the sum a+b is an integer from 1 to 3), (h-2) a dimethylpolysiloxane capped at one end of the molecular chain with a trialkoxy group and represented by general formula (3) below

[Chem. 2]

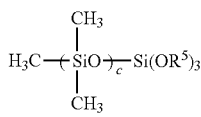

(3)

(wherein each $R^5$ is independently an alkyl group of 1 to 6 carbon atoms, and the subscript "c" is an integer from 5 to 100).

4. The heat-conductive thin film-like cured product of any of 1 to 3, wherein component (b) is a heat-conductive filler selected from the group consisting of metals, oxides and nitrides.

5. A method for producing the heat-conductive thin film-like cured product of any of 1 to 4, which method includes the step of forming the above silicone composition into a thin film on a surface release-treated substrate and curing the composition.

6. The production method of 5, wherein a modified silicone containing a fluorinated substituent on the backbone is used as a treatment ingredient in the surface release treatment.

7. A heat-conductive member having a substrate that has been surface release-treated for a silicone adhesive and a heat-conductive thin film-like cured product obtained by forming the above silicone composition into a thin film on the surface release-treated substrate and curing the composition.

8. The heat-conductive member of 7, wherein a modified silicone containing a fluorinated substituent on the backbone is used as a treatment ingredient in the surface release treatment.

Advantageous Effects of Invention

The heat-conductive thin film-like cured product of the invention has a good transferability to a member, has a good handleability following release even as a single layer or thin film, and is tacky and can be easily attached to a heat-generating device or a heat-dissipating member.

DESCRIPTION OF EMBODIMENTS

The invention is described in detail below.

[Component (a)]

Component (a) is an organopolysiloxane having at least two alkenyl groups per molecule. One such organopolysiloxane may be used alone or two or more may be used in suitable combination. Specific examples of component (a) include organopolysiloxanes having the following average structural formulas (4) to (6)

[Chem. 3]

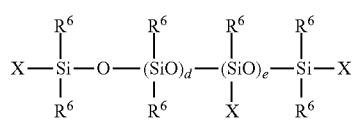

(4)

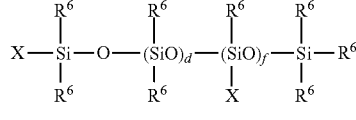

(5)

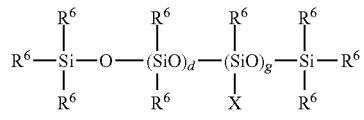

(6)

(wherein each $R^6$ is independently a substituted or unsubstituted monovalent hydrocarbon group that has no aliphatic unsaturated bonds, X is an alkenyl group, the subscripts "d" and "e" are each 0 or a positive number of 1 or more, the subscript "f" is a positive number of 1 or more, and the subscript "g" is a positive number of 2 or more).

Examples of substituted or unsubstituted monovalent hydrocarbon groups that have no aliphatic unsaturated bonds represented by $R^6$ include alkyl groups such as methyl, ethyl, propyl, isopropyl, butyl, isobutyl, tert-butyl, pentyl, neopentyl, hexyl, heptyl, octyl, nonyl, decyl and dodecyl groups; cycloalkyl groups such as cyclopentyl, cyclohexyl and cycloheptyl groups; aryl groups such as phenyl, tolyl, xylyl, naphthyl and biphenylyl groups; aralkyl groups such as benzyl, phenylethyl, phenylpropyl and methylbenzyl groups; and any of these groups in which some or all hydrogen atoms bonded to carbon atoms are substituted with halogen atoms such as fluorine, chlorine or bromine or with cyano groups or the like, illustrative examples of which include those having from 1 to 10 carbon atoms, especially those having from 1 to 6 carbon atoms, such as chloromethyl, 2-bromoethyl, 3-chloropropyl, 3,3,3-trifluoropropyl, chlorophenyl, fluorophenyl, cyanoethyl and 3,3,4,4,5,5,6,6,6-nanofluorohexyl groups. Of these, substituted or unsubstituted alkyl groups of 1 to 3 carbon atoms, such as methyl, ethyl, propyl, chloromethyl, bromoethyl, 3,3,3-trifluoropropyl and cyanoethyl, and substituted or unsubstituted phenyl groups such as phenyl, chlorophenyl and fluorophenyl groups are preferred. The $R^6$ groups may be all the same or may be different. Unless special properties such as solvent resistance are required, from the standpoint of such considerations as cost, availability, chemical stability and environmental impact, it is preferable for methyl groups to be selected for all of the $R^6$ groups.

Examples of the alkenyl group represented by X include alkenyl groups of 2 to 8 carbon atoms, such as vinyl, allyl, propenyl, isopropenyl, butenyl, hexenyl and cyclohexenyl groups. Of these, lower alkenyl groups such as vinyl and allyl groups are preferred. A vinyl group is more preferred.

The subscript "d" is 0 or a positive number of 1 or more, with $10 \le d \le 10{,}000$ being preferred, $50 \le d \le 2{,}000$ being more preferred, and $100 \le d \le 1{,}000$ being even more preferred.

The subscript "e" is 0 or a positive number of 1 or more, with $0 \le e/(d+e) \le 0.5$ being preferred, and $0 \le e/(d+e) \le 0.1$ being more preferred.

The subscript "f" is a positive number of 1 or more, with $0 < f/(d+f) \le 0.5$ being preferred, and $0 < f/(d+f) \le 0.1$ being more preferred.

The subscript "g" is a positive number of 2 or more, with $0 < g/(d+g) \le 0.5$ being preferred, and $0 < g/(d+g) \le 0.1$ being more preferred.

The organopolysiloxane of component (a) may be in the form of an oil or a gum. One such organopolysiloxane may be used alone, or a plurality having differing viscosities may be used together. The average degree of polymerization is preferably from 10 to 100,000, and more preferably from 100 to 10,000. The degree of polymerization can be determined as a polystyrene-equivalent value in gel permeation chromatographic (GPC) analysis using toluene as the developing solvent, and is the number-average degree of polymerization (the same applies below.

[Component (b)]

The heat-conductive filler serving as component (b) is not particularly limited. Examples include nonmagnetic metals such as copper and aluminum; oxides such as aluminum oxide (alumina), silica, magnesia, red iron oxide, beryllia, titania and zirconia; nitrides such as aluminum nitride, silicon nitride and boron nitride; and synthetic diamond and silicon carbide. Of these, metals, oxides and nitrides are preferred, and aluminum oxide, boron nitride and aluminum hydroxide are more preferred.

The heat-conductive filler has an average particle size of preferably from 0.1 to 100 μm, more preferably from 0.5 to 50 μm, and even more preferably from 0.5 to 30 μm. These heat-conductive fillers may be of one type used alone, or a plurality of types may be used in admixture. It is also possible to use two or more types of particles having different average particle sizes. In this invention, the average particle size is the volume mean particle diameter (MV value) determined by Microtrac (laser diffraction scattering) and can be measured with, for example, the Microtrac MT-3300EX particle size analyzer (Nikkiso Co., Ltd.).

The content of component (b) per 100 parts by weight of component (a) is from 200 to 2,000 parts by weight, and preferably from 500 to 1,500 parts by weight. When the heat-conductive filler content is too high, the flowability is lost and forming is difficult; when it is too low, the desired heat conductivity cannot be obtained.

[Component (c)]

The organohydrogenpolysiloxane having at least two directly silicon-bonded hydrogen atoms per molecule has at least two, and preferably three or more, hydrogen atoms that are directly bonded to a silicon atom (i.e., Si—H groups) on the molecular chain. The organohydrogenpolysiloxane of component (c) is not a compound having a phenylene skeleton. Such organohydrogenpolysiloxanes are exemplified by compounds of average structural formulas (7) to (9) below

[Chem. 4]

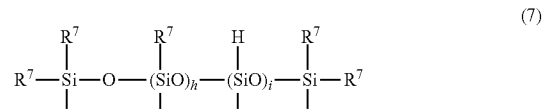

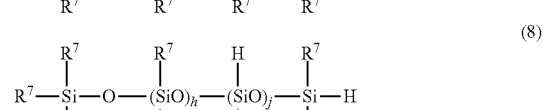

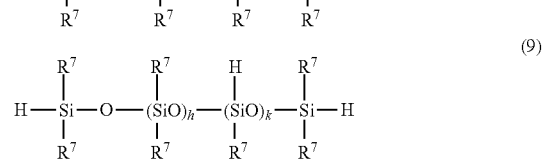

(wherein each $R^7$ is independently a substituted or unsubstituted monovalent hydrocarbon group that has no aliphatic unsaturated bonds, the subscript "h" is 0 or a positive number of 1 or more, the subscript "i" is a positive number of 2 or more, the subscript "j" is a positive number of 1 or more, and the subscript "k" is 0 or a positive number of 1 or more).

Illustrative examples of the substituted or unsubstituted monovalent hydrocarbon groups that have no aliphatic unsaturated bonds represented by $R^7$ in formulas (7) to (9) include alkyl groups such as methyl, ethyl, propyl, isopropyl, butyl, isobutyl, tert-butyl, pentyl, neopentyl, hexyl, heptyl, octyl, nonyl, decyl and dodecyl groups; cycloalkyl groups such as cyclopentyl, cyclohexyl and cycloheptyl groups; aryl groups such as phenyl, tolyl, xylyl, naphthyl and biphenylyl groups; aralkyl groups such as benzyl, phenylethyl, phenylpropyl and methylbenzyl groups; and any of these groups in which some or all hydrogen atoms bonded to carbon atoms are substituted with halogen atoms such as fluorine, chlorine or bromine, cyano groups or the like, illustrative examples of which include those having from 1 to 10 carbon atoms, especially those having from 1 to 6 carbon atoms, such as chloromethyl, 2-bromoethyl, 3-chloropropyl, 3,3,3-trifluoropropyl, chlorophenyl, fluorophenyl, cyanoethyl and 3,3,4,4,5,5,6,6,6-nanofluorohexyl groups. Of these, substituted or unsubstituted alkyl groups of 1 to 3 carbon atoms, such as methyl, ethyl, propyl, chloromethyl, bromoethyl, 3,3,3-trifluoropropyl and cyanoethyl, and substituted or unsubstituted phenyl groups such as phenyl, chlorophenyl and fluorophenyl groups are preferred. The $R^7$ groups may be all the same or may be different, although it is preferable for the substituents to be the same as for $R^6$. As with the $R^6$ groups, unless special properties such as solvent resistance are required, from the standpoint of such considerations as cost, availability, chemical stability and environmental impact, it is preferable for all of the $R^7$ groups to be methyl groups.

In the above formulas, the subscript "h" is 0 or a positive number of 1 or more, preferably from 0 to 500, and more preferably from 5 to 100. The subscript "i" is a positive number of 2 or more, preferably from 2 to 100, and more preferably from 2 to 50. The subscript "j" is a positive number of 1 or more, preferably from 1 to 100, and more preferably from 1 to 50. The subscript "k" is 0 or a positive number of 1 or more, preferably from 0 to 100, and more preferably form 0 to 50. The average degree of polymerization of component (c) is preferably from 5 to 100, and more preferably from 10 to 50.

The content of component (c) is an amount such that the ratio expressed as (number of directly silicon-bonded hydrogen atoms in component (c))/(number of alkenyl groups in component (a)) is from 0.5 to 50.0, preferably from 1.0 to 30.0, and more preferably from 2.0 to 20.0. When the amount of Si—H groups in component (c) per alkenyl group in component (a) is less than 0.5, problems arise. For example, curing of the formed sheet does not proceed well and the strength of the formed sheet is inadequate, so that handling as a formed body becomes impossible. When the amount exceeds 50.0, the sheet following formation lacks a sufficiently tacky feel and so the sheet cannot attach itself by its own tackiness.

[Component (d)]

Component (d) is a platinum group metal compound. One such compound may be used alone or two or more may be used in suitable combination. The platinum group metal compound (platinum group-based curing catalyst) serving as component (d) is a catalyst for promoting an addition reaction between alkenyl groups in component (a) and Si—H groups in component (c), and is exemplified by catalysts that are well-known as catalysts used in hydrosilylation reactions. Specific examples include uncombined platinum group metals such as platinum (including platinum black), rhodium and palladium; platinum chlorides such as $H_2PtCl_4 \cdot m'H_2O$, $H_2PtCl_6 \cdot m'H_2O$, $NaHPtCl_6 \cdot m'H_2O$, $KHPtCl_6 \cdot m'H_2O$, $Na_2PtCl_6 \cdot m'H_2O$, $K_2PtCl_4 \cdot m'H_2O$, $PtCl_4 \cdot m'H_2O$, $PtCl_2$ and $Na_2HPtCl_4 \cdot m'H_2O$ (wherein m' is an integer from 0 to 6, and preferably 0 or 6); chloroplatinic acid and chloroplatinic acid, alcohol-modified chloroplatinic acid salts, complexes of chloroplatinic acid and olefins, platinum group metals such as platinum black and palladium that are supported on a support such as aluminum oxide, silica or carbon, rhodium-olefin complexes, chlorotris(triphenylphosphine)rhodium (Wilkinson's catalyst), and complexes of platinum chloride, chloroplatinic acid or a chloroplatinic acid salt with a vinyl group-containing siloxane.

The amount of component (d) used may be the so-called catalytic amount, and is generally from 0.1 to 1,000 ppm (weight), preferably from 0.5 to 200 ppm, and more preferably from 1.0 to 100 ppm, based on component (a).

[Component (e)]

The reaction regulator serving as component (e) is an addition reaction regulator which adjusts the rate of the reaction between component (a) and component (c) that proceeds in the presence of component (d). This may be of one type used alone or two or more may be used in suitable combination. Component (e) is exemplified by acetylene alcohol compounds such as ethynyl methylidene carbinol, amine compounds, phosphorus compounds and sulfur compounds. Of these, acetylene alcohol compounds are preferred.

Component (e) may be included in any amount that is necessary for adjusting the reaction to the desired rate, although the content is preferably from 0.01 to 2.0 parts by weight per 100 parts by weight of component (a).

[Component (f)]

The silicone resin serving as component (f) used in this invention is added so as to confer tack to the cured product of the invention. Component (f) is a silicone resin containing $R^1_3SiO_{1/2}$ units (M units) (wherein $R^1$ is a substituted or unsubstituted monovalent hydrocarbon group that has no aliphatic unsaturated bonds) and $SiO_{4/2}$ units (Q units) in a molar ratio expressed as ($R^1_3SiO_{1/2}$ units)/($SiO_{4/2}$ units) of from 0.1 to 3.0, preferably from 0.6 to 1.4, and more preferably from 0.7 to 1.3. When M/Q is less than 0.1, or M/Q is more than 3.0, the desired tack strength may not be obtained.

$R^1$ is a substituted or unsubstituted monovalent hydrocarbon group that has no aliphatic unsaturated bonds. Specific examples include alkyl groups such as methyl, ethyl, propyl, isopropyl, butyl, isobutyl, tert-butyl, pentyl, neopentyl, hexyl, heptyl, octyl, nonyl, decyl and dodecyl groups; cycloalkyl groups such as cyclopentyl, cyclohexyl and cycloheptyl groups; aryl groups such as phenyl, tolyl, xylyl, naphthyl and biphenylyl groups; aralkyl groups such as benzyl, phenylethyl, phenylpropyl and methylbenzyl groups; and any of these groups in which some or all hydrogen atoms bonded to carbon atoms are substituted with halogen atoms such as fluorine, chlorine or bromine, cyano groups or the like, illustrative examples of which include those having from 1 to 10 carbon atoms, and especially from 1 to 6 carbon atoms, such as chloromethyl, 2-bromoethyl, 3-chloropropyl, 3,3,3-trifluoropropyl, chlorophenyl, fluorophenyl, cyanoethyl and 3,3,4,4,5,5,6,6,6-nanofluorohexyl groups. Of these, substituted or unsubstituted alkyl groups of 1 to 3 carbon atoms, such as methyl, ethyl, propyl, chloromethyl, bromoethyl, 3,3,3-trifluoropropyl and cyanoethyl, and substituted or unsubstituted phenyl groups such as phenyl, chlorophenyl and fluorophenyl groups are preferred. The $R^1$ groups may be all the same or may be different, although it is preferable for the substituents to be the same as for $R^6$. As with the $R^6$ groups, unless special properties such as solvent resistance are required, from the standpoint of such considerations as cost, availability, chemical stability and environmental impact, it is preferable for all of the $R^1$ groups to be methyl groups.

The content of component (f) per 100 parts by weight of component (a) is from 50 to 300 parts by weight, preferably from 60 to 200 parts by weight, and more preferably from 70 to 150 parts by weight. At a component (f) content of less than 50 parts by weight or more than 300 parts by weight, the desired tack cannot be obtained. Component (f) itself is a solid or viscous liquid at room temperature, although it is possible to use it in a solvent-dissolved state. In this case, the amount added to the composition is determined as the amount exclusive of the solvent component.

[Component (g)]

Component (g) is an adhesive ingredient selected from (g-1) and (g-2) below:
(g-1) a compound of general formula (1) below:

[Chem. 5]

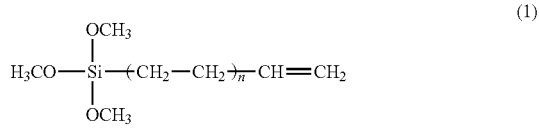
(1)

(wherein n is an integer from 1 to 15);
(g-2) an organosilicon compound of from 1 to 100 silicon atoms which has at least one phenylene skeleton and at least one silicon-bonded hydrogen atom per molecule.

One such compound may be used alone or two or more may be used in suitable combination. By including component (g) in the composition, the cured product can have good adhesiveness even at elevated temperatures.

Component (g-1) is a compound of general formula (1). From the standpoint of adhesiveness, the subscript "n" is an integer from 1 to 15, preferably from 2 to 10, and more preferably from 4 to 10.

Component (g-2) is an organosilicon compound of from 1 to 100 silicon atoms having at least one phenylene skeleton and at least one silicon-bonded hydrogen atom (Si—H group) on the molecule. In this invention, "phenylene skeleton" encompasses divalent to hexavalent, especially divalent to tetravalent, aromatic polycyclic skeletons such as phenylene skeletons, naphthalene skeletons and anthracene skeletons.

It is desirable for the organosilicon compound to be one having at least 1, and preferably from 1 to 4, phenylene skeletons on the molecule and having at least 1, preferably from 1 to about 20, and more preferably from about 2 to about 10, Si—H groups (i.e., silicon-bonded hydrogen atoms) per molecule. In addition, one or more type of functional group, examples of which include epoxy groups such as glycidoxy groups, alkoxysilyl groups such as trimethoxysilyl, triethoxysilyl and methyldimethoxysilyl groups, as well as ester groups, acrylic groups, methacrylic groups, anhydrous carboxyl groups, isocyanate groups, amino groups and amide groups, may be included. The number of silicon atoms is from 1 to 10, preferably from 2 to 30, more preferably from 2 to 20, and even more preferably from 4 to 10. The structure is not particularly limited; suitable use can be made of organosilicon compounds such as linear or cyclic organosiloxane oligomers and organosilanes.

Specific examples of such compounds include the compounds shown below:

[Chem. 6]

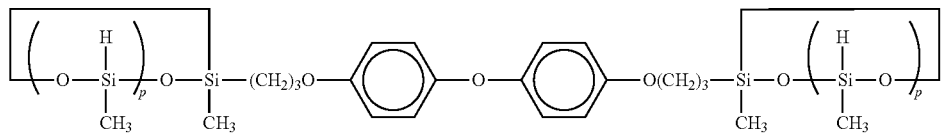

[Chem. 7]

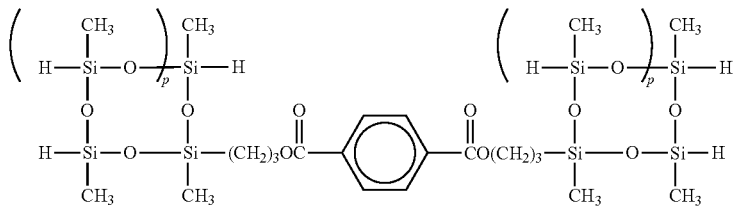

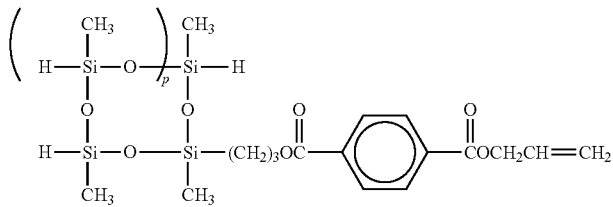

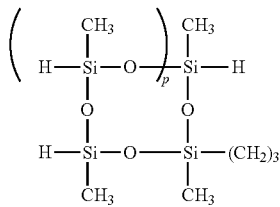
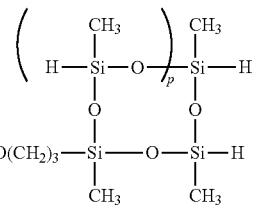

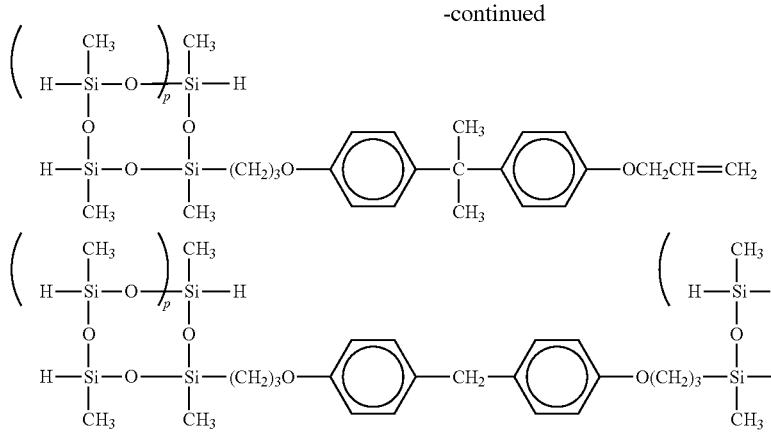
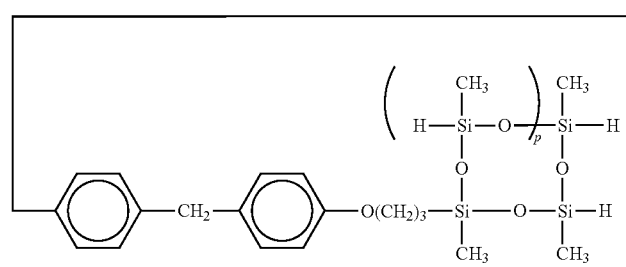
(wherein each "p" is independently from 1 to 4)
[Chem. 8]
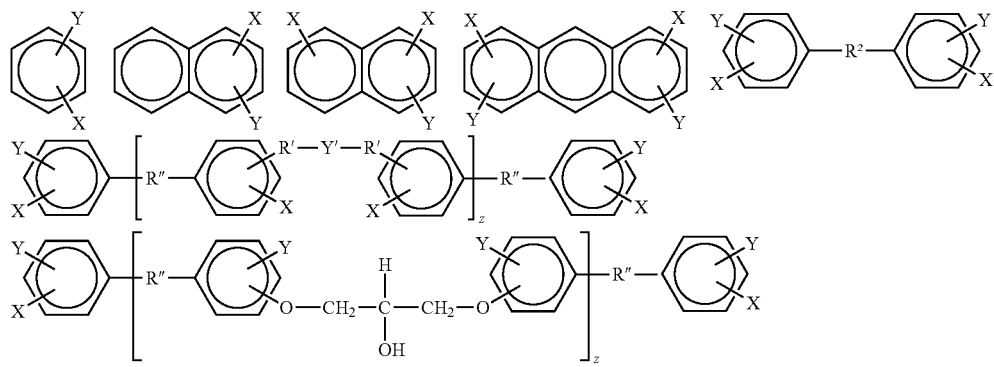
[wherein X is
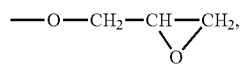
Y is a group selected from
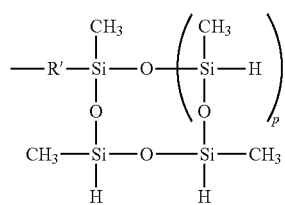
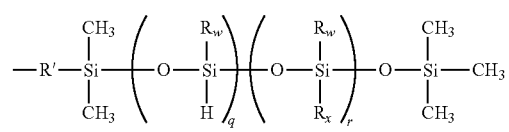
(R' being a group selected from
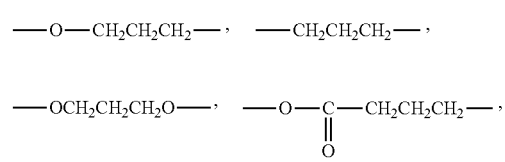

-continued

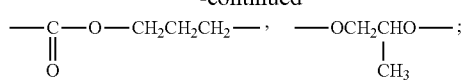

$R_w$ and $R_x$ each being a substituted or unsubstituted monovalent hydrocarbon group; p being from 1 to 4, q being from 1 to 50 and r being from 0 to 100, with q being preferably from 1 to 20 and r being preferably from 1 to 50), R" is a group selected from

[Chem. 9]

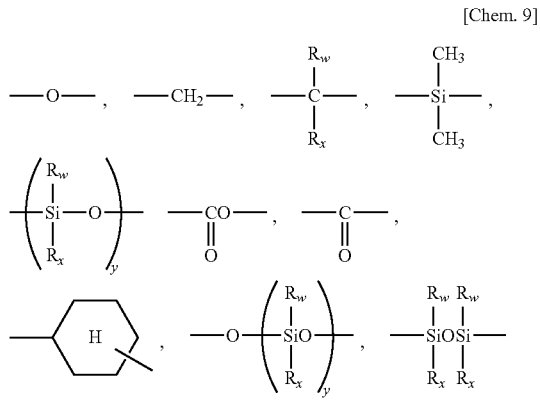

($R_w$ and $R_x$ being the same as above, and y=1 to 100), Y' is

[Chem. 10]

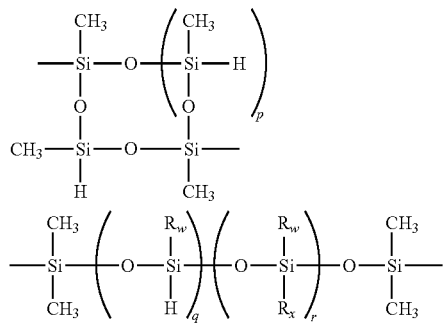

($R_w$ and $R_x$ being the same as above, p being 1 to 4, q being 1 to 50 and r being 0 to 100, with q being preferably from 1 to 20 and r being preferably from 1 to 50), and the subscript "z" is 1 to 50].

The substituted or unsubstituted monovalent hydrocarbon groups represented by $R_w$ and $R_x$ are ones having preferably from 1 to 12 carbon atoms, especially from 1 to 8 carbon atoms. These are exemplified by alkyl groups, aryl groups, aralkyl groups and alkenyl groups, and the substituted monovalent hydrocarbon groups are exemplified by the foregoing groups substituted with alkoxy, acrylic, methacrylic, acryloyl, methacryloyl, amino or alkylamino groups.

Organosilicon compounds obtained by additionally introducing, in the above exemplary compounds, alkoxysilyl groups such as trimethoxysilyl, triethoxysilyl and methyldimethoxysilyl groups, acrylic groups, methacrylic groups, ester groups, anhydrous carboxyl groups, isocyanate groups, amino groups and amide groups may also be used as component (g-2).

The content of silicon-bonded hydrogen atoms (Si—H groups) in the organosilicon compound of component (g-2) is preferably from 0.001 to 0.01 mol/g, and more preferably from 0.002 to 0.01 mol/g. For sufficient adhesiveness, the content is preferably at least 0.001 mol/g. However, at more than 0.01 mol/g, the organosilicon compound of component (g-2) may become an unstable substance at room temperature.

The content of component (g) is from 0.1 to 20 parts by weight, preferably from 0.5 to 15 parts by weight, and more preferably from 1.0 to 10 parts by weight, per 100 parts by weight of component (a). When the amount of component (g) added is less than 0.1 part by weight or more than 20 parts by weight, the desired adhesiveness cannot be obtained. For the overall composition, the amount is such that the ratio expressed as "number of Si—H groups/number of alkenyl groups" is preferably from 0.5 to 50.0, more preferably from 1.0 to 30.0, and even more preferably from 2.0 to 20.0.

[Component (h)]

The silicone composition of the invention preferably includes one or more surfactant selected from (h-1) and (h-2) below. By including a surfactant, during preparation of the silicone composition, the heat-conductive filler serving as component (b) can be uniformly dispersed within the matrix made up of component (a).

(h-1) An alkoxysilane compound of general formula (2) below $$R^2_a R^3_b Si(OR^4)_{4-a-b} \qquad (2)$$

(wherein each $R^2$ is independently an alkyl group of 6 to 15 carbon atoms, each $R^3$ is independently a substituted or unsubstituted monovalent hydrocarbon group of 1 to 8 carbon atoms, each $R^4$ is independently an alkyl group of 1 to 6 carbon atoms, the subscript "a" is an integer from 1 to 3, the subscript "b" is an integer from 0 to 2, and the sum a+b is an integer from 1 to 3).

Examples of the alkyl group represented by $R^2$ include hexyl, octyl, nonyl, decyl, dodecyl and tetradecyl groups. When the number of carbon atoms on this alkyl group represented by $R^2$ falls in the range of 6 to 15, the component (C) wettability sufficiently improves, resulting in a good handleability and good low-temperature properties for the composition.

Illustrative examples of the substituted or unsubstituted monovalent hydrocarbon group represented by $R^3$ include alkyl groups such as methyl, ethyl, propyl, isopropyl, butyl, isobutyl, tert-butyl, pentyl, neopentyl, hexyl, heptyl, octyl, nonyl, decyl and dodecyl groups; cycloalkyl groups such as cyclopentyl, cyclohexyl and cycloheptyl groups; aryl groups such as phenyl, tolyl, xylyl, naphthyl and biphenylyl groups; aralkyl groups such as benzyl, phenylethyl, phenylpropyl and methylbenzyl groups; and any of these groups in which some or all hydrogen atoms bonded to carbon atoms are substituted with halogen atoms such as fluorine, chlorine or bromine, cyano groups or the like, typical examples of which include those having from 1 to 10 carbon atoms, especially those having from 1 to 6 carbon atoms, such as chloromethyl, 2-bromoethyl, 3-chloropropyl, 3,3,3-trifluoropropyl, chlorophenyl, fluorophenyl, cyanoethyl and 3,3,4,4,5,5,6,6,6-nanofluorohexyl groups. Substituted or unsubstituted alkyl groups of 1 to 3 carbon atoms such as methyl, ethyl, propyl, chloromethyl, bromoethyl, 3,3,3-trifluoropropyl and cyanoethyl, and substituted or unsubstituted phenyl groups such as phenyl, chlorophenyl and fluorophenyl groups are preferred.

(h-2) A dimethylpolysiloxane capped at one end of the molecular chain with a trialkoxy group and represented by general formula (3) below

[Chem. 11]

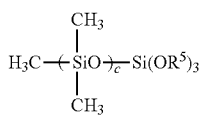

(3)

(wherein each $R^5$ is independently an alkyl group of 1 to 6 carbon atoms, and the subscript "c" is an integer from 5 to 100).

The alkyl group represented by $R^5$ is exemplified in the same way as the alkyl group represented by $R^4$ in general formula (2) above.

Either one of component (h-1) and component (h-2) may serve as the surfactant, or both may be used in combination as the surfactant. The content of component (h) per 100 parts by weight of component (a) is preferably from 0.1 to 40 parts by weight, and more preferably from 1 to 20 parts by weight. When the component (h) content is less than 0.1 part by weight, it may be difficult to fill component (a) with component (b); on the other hand, at more than 40 parts by weight, the bond strength of the cured product may decrease.

[Other Ingredients]

In addition, heat-conductive filler surfactants, pigments and dyes for coloration, flame retardants and various additives for enhancing other functions may be added to the silicone composition of the invention within ranges that do not detract from the objects of the invention.

[Heat-Conductive Thin Film-Like Cured Product]

The heat-conductive thin film-like cured product can be obtained by, for example, a production method which includes the steps of uniformly mixing together the above essential ingredients and optional ingredients to obtain a silicone composition, forming the silicone composition into a thin film on a substrate, preferably a surface release-treated substrate, and curing the composition.

The method of forming the composition on a substrate is exemplified by the use of a bar coater, knife coater, comma coater, spin coater or the like to apply the liquid material onto a substrate, but is not limited to such methods.

The heating temperature conditions for heating the composition following formation should be such that, in cases where a solvent is added, the solvent that is used vaporizes and components (a) and (c) can react. From the standpoint of productivity and other considerations, a temperature between 60° C. and 150° C. is preferred, and a temperature between 80° C. and 150° C. is more preferred. At below 60° C. the curing reaction slows and productivity may worsen; at above 150° C., the film used as the substrate may deform. The curing time is generally from 0.5 to 30 minutes, and preferably from 1 to 20 minutes.

The heat-conductive thin film-like cured product has a thickness of preferably from 20 to 1,000 μm, and more preferably from 30 to 500 μm. At a formed thickness of less than 20 μm, handling is difficult and the tacky feel may decrease. On the other hand, at a formed thickness in excess of 1,000 μm, it may not be possible to obtain the desired heat conductivity. Also, during coating, it is possible to add a solvent such as toluene or xylene so as to adjust the viscosity.

The substrate is preferably a substrate obtained by subjecting paper or polyethylene terephthalate (PET) film to surface release treatment for silicone adhesives. The film thickness is preferably from 15 to 100 μm. The treatment method entails coating a surface release treatment ingredient onto PET using a gravure coater or a kiss coater. The surface release treatment ingredient used in such surface release treatment is preferably a non-dimethyl silicone polymer, and more preferably a modified silicone which includes a fluorinated substituent such as a perfluoropolyether group on the backbone. Specific examples of the perfluoropolyether group include those of formulas (10) to (12) below.

[Chem. 12]

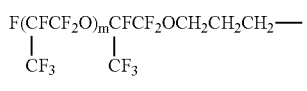

(10)

(m = 1~5)

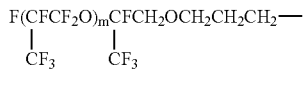

(11)

(m = 1~5)

(12)

(o = 3~10)

Specific examples of modified silicones having such fluorinated substituents include X-70-201 and X-70-258 from Shin-Etsu Chemical Co., Ltd.

After curing, by attaching a release-treated film similar to the substrate (film) as a separator film onto the opposite side of the heat-conductive thin film-like cured product from the substrate, handling during transport, cutting to standard sizes and the like can be made easier. It is also possible at this time to ease or tighten the release force between the substrate film and the separator film by changing the amount and type of release agent used to treat the substrate film and by changing the film material. The heat-conductive cured product thus obtained, after peeling off the separator film or the substrate (film), is attached to a heat-generating device or a heat-dissipating member, following which the remaining film is peeled off. In this way, the cured product can be easily positioned even though it is a thin film, and moreover exhibits excellent heat conductivity.

The heat-conductive thin film-like cured product has a thermal conductivity which is preferably at least 0.7 W/mK, and more preferably at least 1 W/mK. Although there is no particular upper limit, this may be set to 5 W/mK or less. The thermal conductivity is measured by the method described in the "Examples" section below.

The shear bond strength to aluminum at 150° C. is preferably at least 0.5 MPa and, although there is no particular upper limit, may be set to 15 MPa or less. A value of from 1 to 5 MPa is more preferred. The shear bond strength to aluminum at 150° C. is measured by the method described in the "Examples" section below.

[Heat-Conductive Member]

A heat-conductive member having a substrate and a heat-conductive thin film-like cured product can be obtained in which the above-described silicone composition is formed into a thin film on the substrate, preferably a surface release-treated substrate, and then cured.

EXAMPLES

The invention is illustrated more fully below by way of Examples and Comparative Examples, although the invention is not limited by these Examples. Unless noted otherwise, references to "%" of a composition are by weight (wt %) and "Me" stands for a methyl group.

Components (a) to (h) used in the following Examples and Comparative Examples are described below.

Component (a):
- A dimethylpolysiloxane capped at both ends with dimethylvinyl groups and having an average degree of polymerization of 8,000

Component (b):
- (b-1) Granular aluminum oxide having an average particle size of 1 μm
- (b-2) Spherical aluminum oxide having an average particle size of 1 μm
- (b-3) Spherical aluminum oxide having an average particle size of 10 μm
- (b-4) Granular boron nitride having an average particle size of 10 μm
- (b-5) Spherical aluminum oxide having an average particle size of 45 μm Component (c):
- A hydrogenpolysiloxane of the following formula which has pendant Si—H groups and an average degree of polymerization of 8

[Chem. 13]

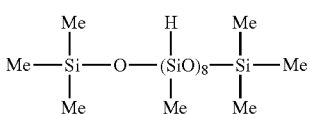

Component (d): A 5% solution of chloroplatinic acid in 2-ethylhexanol

Component (e): Ethynyl methylidene carbinol as an addition reaction regulator

Component (f):
- A toluene solution of a silicone resin (nonvolatiles content, 60%; M/Q (molar ratio)=1.15 (where M units are $R^1_3SiO_{1/2}$ units, Q units are $SiO_{4/2}$ units, and $R^1$ stands for a methyl group). In the tables, the numbers in parentheses indicate the amount of silicone resin.

Component (g):
Component (g-1) is an ingredient of the following formula

[Chem. 14]

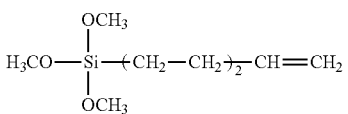

Component (g-2) is an ingredient of the following formula

[Chem. 15]

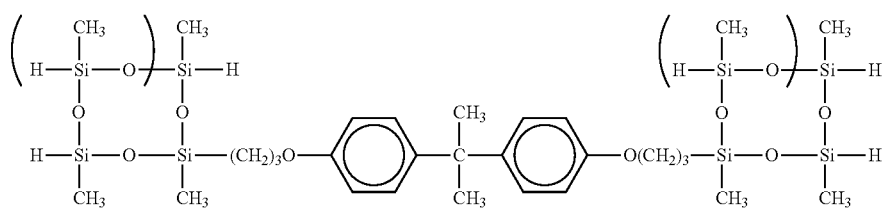

Component (h):
A dimethylpolysiloxane of the formula below which is capped at one end with a trimethoxysilyl group and has an average degree of polymerization of 30

[Chem. 16]

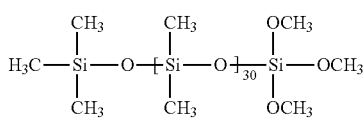

EXAMPLES AND COMPARATIVE EXAMPLES

<Preparation of Silicone Composition>
Components (a), (b), (c), (e), (f) and (h) were charged into a Shinagawa-type universal mixer and mixed together for 60 minutes, following which component (d) was added and uniformly mixed in and then component (g) was added, giving a silicone composition.
<Formation of Cured Product>
A suitable amount of toluene was added to the resulting silicone composition, the composition was applied onto a 38 μm-thick surface release-treated (with a modified silicone containing perfluoroalkyl groups on the backbone) PET film and the toluene was removed by vaporization at 80° C., following which 10 minutes of curing was carried out at 120° C., thereby giving a heat-conductive pressure-sensitive tape that includes a heat-conductive thin film-like cured product having a thickness of 200 μm.

[Evaluation Methods]
The following evaluations were carried out on the heat-conductive thin film-like cured product.
Transferability:
The heat-conductive thin film-like cured product was evaluated as to whether the desired tackiness can be obtained when it is attached to an aluminum plate. Cases in which tackiness can be obtained were rated as "○"; cases in which there were problems with the tackiness were rated as "X."
Handleability after Release:
The manual handleability of the heat-conductive thin film-like cured product after peeling off the heat-conductive pressure-sensitive tape was evaluated by noting the shape of this body. Cases in which the handleability was good were rated as "○"; cases in which there were problems with the handleability were rated as "X."
Thermal Conductivity:
The heat-conductive pressure-sensitive tape was sandwiched between aluminum plates and 20 psi of pressure was applied for 1 hour at room temperature, following which the thermal resistance was measured by the laser flash method. The thermal conductivity was derived from the relationship between the thickness and the thermal resistance.
Shear Bond Strength to Aluminum:
The heat-conductive pressure-sensitive tape was sandwiched between 10×10 cm square aluminum plates and 20 psi of pressure was applied for 1 hour at 120° C., following which the peel shear strength was measured at 150° C.

TABLE 1

| Formulation (pbw) | | Example | | | | | |
|---|---|---|---|---|---|---|---|
| | | 1 | 2 | 3 | 4 | 5 | 6 |
| | (a) | 100 | 100 | 100 | 100 | 100 | 100 |
| (b) | (b-1) | 300 | 500 | | 300 | 50 | 300 |
| | (b-2) | | | | | | |
| | (b-3) | 400 | 700 | | | 400 | |
| | (b-4) | | | 1,000 | | | 500 |
| | (b-5) | | | | 600 | | |
| | (c) | 1.0 | 1.0 | 1.0 | 1.0 | 1.0 | 1.0 |
| | (d) | 0.7 | 0.7 | 0.7 | 0.7 | 0.7 | 0.7 |
| | (e) | 0.3 | 0.3 | 0.3 | 0.3 | 0.3 | 0.3 |
| | (f) | 200 (120) | 200 (120) | 200 (120) | 200 (120) | 200 (120) | 200 (120) |
| (g) | (g-1) | 5 | 2 | 10 | 1 | 0 | 5 |
| | (g-2) | 0 | 3 | 5 | 1 | 15 | 5 |
| | (h) | 10 | 10 | 10 | 10 | 10 | 10 |
| (Number of directly silicon-bonded hydrogen atoms (Si—H groups) in component (c))/ (Number of alkenyl groups in component (a)) | | 3.5 | 3.5 | 3.5 | 3.5 | 3.5 | 3.5 |
| Transferability | | ○ | ○ | ○ | ○ | ○ | ○ |
| Handleability | | ○ | ○ | ○ | ○ | ○ | ○ |
| Thermal conductivity (W/mK) | | 1.0 | 2.7 | 2.4 | 1.8 | 0.7 | 2.2 |
| Shear bond strength to aluminum (MPa) | | 2.5 | 3.0 | 2.4 | 2.1 | 2.3 | 2.0 |

TABLE 2

| Formulation (pbw) | | Comparative Example | | | | | |
|---|---|---|---|---|---|---|---|
| | | 1 | 2 | 3 | 4 | 5 | 6 |
| | (a) | 100 | 100 | 100 | 100 | 100 | 100 |
| (b) | (b-1) | 50 | 500 | | 300 | 50 | 300 |
| | (b-2) | | | | | | |
| | (b-3) | 100 | 700 | | | 400 | |

TABLE 2-continued

| Formulation (pbw) | | Comparative Example 1 | 2 | 3 | 4 | 5 | 6 |
|---|---|---|---|---|---|---|---|
| | (b-4) | | | 1,000 | | | 500 |
| | (b-5) | | | | 600 | | |
| | (c) | 1.0 | 0.15 | 1.0 | 1.0 | 1.0 | 1.0 |
| | (d) | 0.7 | 0.7 | 0.7 | 0.7 | 0.7 | 0.7 |
| | (e) | 0.3 | 0.3 | 0.3 | 0.3 | 0.3 | 0.3 |
| | (f) | 200 (120) | 200 (120) | 50 (30) | 200 (120) | 200 (120) | 200 (120) |
| (g) | (g-1) | 5 | 2 | 10 | 0.05 | 30 | 20 |
| | (g-2) | 0 | 3 | 5 | 0.03 | 0 | 20 |
| | (h) | 10 | 10 | 10 | 10 | 10 | 10 |
| (Number of directly silicon-bonded hydrogen atoms (Si—H groups) in component (c))/ (Number of alkenyl groups in component (a)) | | 3.5 | 0.4 | 3.5 | 3.5 | 3.5 | 3.5 |
| Transferability | | ○ | ○ | X | ○ | ○ | ○ |
| Handleability | | ○ | X | ○ | ○ | ○ | ○ |
| Thermal conductivity (W/mK) | | 0.3 | 2.7 | 2.7 | 2.0 | 0.6 | 2.0 |
| Shear bond strength to aluminum (MPa) | | 2.4 | ND | ND | 0.4 | 0.3 | 0.5 |

In Examples 1 to 6, superior heat-conductive cured products were obtained which had an excellent transferability and handleability after curing, and which were also good in terms of the thermal conductivity and the bond strength during high-temperature packaging.

In Comparative Example 1, the amount of the heat-conductive filler serving as component (b) was less than 200 parts by weight, and so the desired thermal conductivity could not be obtained.

In Comparative Example 2, the molar ratio between the directly silicon-bonded hydrogen atoms in the organohydrogenpolysiloxane serving as component (c) and the alkenyl groups in component (a) was smaller than 0.5, and so the handleability of the cured product was poor.

In Comparative Example 3, the amount of silicone resin serving as component (f) was less than 50 parts by weight, and so the transferability of the cured product was poor.

In Comparative Example 4 to 6, the amount of the adhesive ingredient serving as component (g) fell outside the range of 0.1 to 20 parts by weight, and so the desired shear bond strength at an elevated temperature could not be obtained.

As mentioned above, the present invention gives a heat-conductive cured product which has an easy handleability, an excellent transferability to a member, and a good bond strength during high-temperature packaging.

The invention claimed is:

1. A heat-conductive thin film-like cured product obtained by curing a silicone composition comprising:
   (a) 100 parts by weight of an organopolysiloxane having at least two alkenyl groups per molecule,
   (b) 200 to 2,000 parts by weight of a heat-conductive filler,
   (c) an organohydrogenpolysiloxane having at least two directly silicon-bonded hydrogen atoms per molecule, in an amount such that the ratio (number of directly silicon-bonded hydrogen atoms in component (c))/ (number of alkenyl groups in component (a)) is from 2.0 to 50.0,
   (d) a platinum group metal compound in an amount relative to component (a), expressed in terms of the amount of platinum group metal element, of from 0.1 to 1,000 ppm (weight),
   (e) a necessary amount of a reaction regulator,
   (f) 50 to 300 parts by weight of a silicone resin, and
   (g) 2 to 20 parts by weight of an adhesive ingredient selected from (g-2) or a combination of (g-2) and (g-1) below (g-1) a compound of general formula (1)

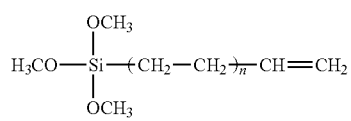

wherein n is an integer from 1 to 15

(g-2) an organosilicon compound of from 1 to 100 silicon atoms which has at least one phenylene skeleton and at least one silicon-bonded hydrogen atom per molecule.

2. The heat-conductive thin film-like cured product of claim 1, wherein component (f) is a silicone resin containing $R^1{}_3SiO_{1/2}$ units (wherein $R^1$ is a substituted or unsubstituted monovalent hydrocarbon group that has no aliphatic unsaturated bonds) and $SiO_{4/2}$ units in a molar ratio expressed as ($R^1{}_3SiO_{1/2}$ units)/($SiO_{4/2}$ units) of from 0.1 to 3.0.

3. The heat-conductive thin film-like cured product of claim 1, wherein the silicone composition further comprises 0.1 to 40 parts by weight of one or more surfactant selected from (h-1) and (h-2) below:

(h-1) an alkoxysilane compound of general formula (2) below

wherein each $R^2$ is independently an alkyl group of 6 to 15 carbon atoms, each $R^3$ is independently a substituted or unsubstituted monovalent hydrocarbon group of 1 to 8 carbon atoms, each $R^4$ is independently an alkyl group of 1 to 6 carbon atoms, the subscript "a" is an integer from 1 to 3, the subscript "b" is an integer from 0 to 2, and the sum a+b is an integer from 1 to 3, (h-2) a dimethylpolysiloxane capped at one end of the molecular chain with a trialkoxy group and represented by general formula (3) below

(3)

wherein each $R^5$ is independently an alkyl group of 1 to 6 carbon atoms, and the subscript "c" is an integer from 5 to 100.

4. The heat-conductive thin film-like cured product of claim 1, wherein component (b) is a heat-conductive filler selected from the group consisting of metals, oxides and nitrides.

5. A method for producing the heat-conductive thin film-like cured product of claim 1, which method comprises the step of forming into a thin film on a surface release-treated substrate and curing a silicone composition comprising:
  (a) 100 parts by weight of an organopolysiloxane having at least two alkenyl groups per molecule,
  (b) 200 to 2,000 parts by weight of a heat-conductive filler,
  (c) an organohydrogenpolysiloxane having at least two directly silicon-bonded hydrogen atoms per molecule, in an amount such that the ratio (number of directly silicon-bonded hydrogen atoms in component (c))/ (number of alkenyl groups in component (a)) is from 2.0 to 50.0,
  (d) a platinum group metal compound in an amount relative to component (a), expressed in terms of the amount of platinum group metal element, of from 0.1 to 1,000 ppm (weight),
  (e) a necessary amount of a reaction regulator,
  (f) 50 to 300 parts by weight of a silicone resin, and
  (g) 2 to 20 parts by weight of an adhesive ingredient selected from (g-2) or a combination of (g-2) and (g-1) below
(g-1) a compound of general formula (1)

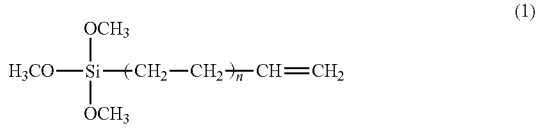

(1)

wherein n is an integer from 1 to 15
(g-2) an organosilicon compound of from 1 to 100 silicon atoms which has at least one phenylene skeleton and at least one silicon-bonded hydrogen atom per molecule.

6. The production method of claim 5, wherein a modified silicone containing a fluorinated substituent on the backbone is used as a treatment ingredient in the surface release treatment.

7. A heat-conductive member comprising:
  a substrate that has been surface release-treated for a silicone adhesive; and
  a heat-conductive thin film-like cured product obtained by forming into a thin film on the surface release-treated substrate and curing a silicone composition comprising:
  (a) 100 parts by weight of an organopolysiloxane having at least two alkenyl groups per molecule,
  (b) 200 to 2,000 parts by weight of a heat-conductive filler,
  (c) an organohydrogenpolysiloxane having at least two directly silicon-bonded hydrogen atoms per molecule, in an amount such that the ratio (number of directly silicon-bonded hydrogen atoms in component (c))/ (number of alkenyl groups in component (a)) is from 2.0 to 50.0,
  (d) a platinum group metal compound in an amount relative to component (a), expressed in terms of the amount of platinum group metal element, of from 0.1 to 1,000 ppm (weight),
  (e) a necessary amount of a reaction regulator,
  (f) 50 to 300 parts by weight of a silicone resin, and
  (g) 2 to 20 parts by weight of an adhesive ingredient selected from (g-2) or a combination of (g-2) and (g-1) below
(g-1) a compound of general formula (1)

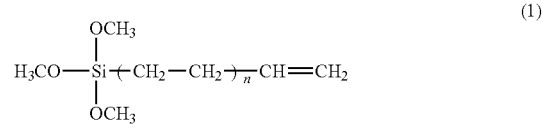

(1)

wherein n is an integer from 1 to 15
(g-2) an organosilicon compound of from 1 to 100 silicon atoms which has at least one phenylene skeleton and at least one silicon-bonded hydrogen atom per molecule.

8. The heat-conductive member of claim 7, wherein a modified silicone containing a fluorinated substituent on the backbone is used as a treatment ingredient in the surface release treatment.

9. The heat-conductive thin film-like cured product of claim 1, wherein the content of component (g) is 2 to 15 parts by weight per 100 parts by weight of component (a).

10. The production method of claim 5, wherein the content of component (g) is 2 to 15 parts by weight per 100 parts by weight of component (a).

11. The heat-conductive member of claim 7, wherein the content of component (g) is 2 to 15 parts by weight per 100 parts by weight of component (a).

* * * * *